US012693798B2

(12) United States Patent
Yu et al.

(10) Patent No.: US 12,693,798 B2
(45) Date of Patent: Jul. 28, 2026

(54) RESOURCE ALLOCATION METHOD AND APPARATUS, ELECTRONIC DEVICE, AND STORAGE MEDIUM

(71) Applicant: New H3C Information Technologies Co., Ltd., Hangzhou (CN)

(72) Inventors: Yinting Yu, Beijing (CN); Xiangming Chen, Beijing (CN); Qi Chen, Beijing (CN)

(73) Assignee: New H3C Information Technologies Co., Ltd., Hangzhou (CN)

( * ) Notice: Subject to any disclaimer, the term of this patent is extended or adjusted under 35 U.S.C. 154(b) by 0 days.

(21) Appl. No.: 18/935,397

(22) Filed: Nov. 1, 2024

(65) Prior Publication Data

US 2025/0138737 A1     May 1, 2025

(30) Foreign Application Priority Data

Nov. 1, 2023    (CN) .......................... 202311448251.1

(51) Int. Cl.
*G06F 3/06* (2006.01)

(52) U.S. Cl.
CPC .......... *G06F 3/0631* (2013.01); *G06F 3/0604* (2013.01); *G06F 3/0673* (2013.01)

(58) Field of Classification Search
CPC .... G06F 3/0631; G06F 3/0604; G06F 3/0673; G06F 3/067; G06F 9/5016; G06F 12/023;
(Continued)

(56) References Cited

U.S. PATENT DOCUMENTS

| 2019/0079686 A1 | 3/2019 | Gupta et al. |
| 2020/0218574 A1 | 7/2020 | Novak et al. |

(Continued)

FOREIGN PATENT DOCUMENTS

| CN | 112948073 A | 6/2021 |
| CN | 114356581 A | 4/2022 |

(Continued)

OTHER PUBLICATIONS

UEFI Specification Version 2.6 (released Jan. 2016), Jan. 2016, 2706 pages.
(Continued)

*Primary Examiner* — Masud K Khan
(74) *Attorney, Agent, or Firm* — BROADVIEW IP LAW, PC

(57) ABSTRACT

Disclosed in the present disclosure are a resource allocation method and apparatus, an electronic device, and a storage medium, which relates to the field of computer technology. The method includes: determining one or more unallocated compute express link (CXL) memory logical blocks in a CXL memory resource pool in response to determining that a remaining memory capacity of a first host is less than a remaining memory capacity threshold of the first host; selecting a target CXL memory logical block from among the one or more unallocated CXL memory logical blocks in the CXL memory resource pool; and allocating a memory resource corresponding to the target CXL memory logical block to the first host via a CXL switch. This solves the problem of complex management of the CXL memory resource pool.

14 Claims, 3 Drawing Sheets

(58) Field of Classification Search
CPC ..... G06F 2212/1016; G06F 2212/1032; G06F 2212/1044; G06F 2212/1056; G06F 2212/152; G06F 2212/154; G06F 2212/254; G06F 12/0284
See application file for complete search history.

(56) References Cited

U.S. PATENT DOCUMENTS

| | | | | |
|---|---|---|---|---|
| 2020/0319812 A1* | 10/2020 | He | ......................... | G06F 3/0665 |
| 2023/0138094 A1* | 5/2023 | Guim Bernat | ........ | G06F 3/0605 |
| | | | | 711/153 |
| 2025/0077107 A1* | 3/2025 | Tan | ....................... | G06F 3/0652 |

FOREIGN PATENT DOCUMENTS

| | | |
|---|---|---|
| CN | 115221156 A | 10/2022 |
| CN | 116069450 A | 5/2023 |
| CN | 116149552 A | 5/2023 |
| CN | 116466879 A | 7/2023 |
| CN | 116483740 A * | 7/2023 ........... G06F 12/023 |
| CN | 116719641 A | 9/2023 |
| CN | 116932229 A | 10/2023 |
| WO | WO-2017107015 A1 * | 6/2017 ............... G06F 3/06 |

OTHER PUBLICATIONS

Coherent Device Attribute Table (CDAT) Specification, 18 pages.
CXL-3.1-Specification, Aug. 2023, 1166 pages.
ACPI Specification Version 6.2 (released May 2017), May 2017, 1192 pages.
Elio Balestrieri et al."Shared resources between visual attention and visual working memory are allocated through rhythmic sampling", Europeanjournal of Neuroscience vol. 55 Issue11-12, Jun. 30, 2022, 14 pages.
Su Ri-ya et al. "Construction and implementation of the IaaS cloud platform based on FusionCompute",Information Technology, Jul. 25, 2017,4 pages.
Extended European Search Report for EP 24210417.2 by European Patent Office dated Mar. 17, 2025.

* cited by examiner

RESOURCE ALLOCATION METHOD AND APPARATUS, ELECTRONIC DEVICE, AND STORAGE MEDIUM

CROSS-REFERENCE TO RELATED APPLICATIONS

This application claims priority to Chinese Patent Application No. 202311448251.1, filed on Nov. 1, 2023, the disclosure of which is incorporated herein by reference in its entirety for all purposes.

TECHNICAL FIELD

The present disclosure relates to the field of computer technology, particularly to a resource allocation method and apparatus, an electronic device, and a storage medium.

BACKGROUND

Compute Express Link (CXL) is an interconnect technology for memory expansion, heterogeneous computing, and system resource disaggregation. Utilizing CXL enables efficient resource sharing and pooling. As illustrated in FIG. 1, a host is connected to a CXL switch, which is connected to a CXL memory resource pool. A Fabric Manager (FM) is responsible for system composition and resource allocation, which has a capability to manage the host, the switch, and the CXL memory resource pool and to allocate a memory resource of the CXL memory resource pool for the host.

SUMMARY

Some examples of the present disclosure are to provide a resource allocation method and apparatus, an electronic device, and a storage medium, so as to solve the problem of complex management of the CXL memory resource pool. Some technical solutions are as follows.

In some examples of the present disclosure, a resource allocation method performed by a CXL FM is provided. The method includes:

determining one or more unallocated CXL memory logical blocks in a CXL memory resource pool in response to a determination that a remaining memory capacity of a first host is less than a remaining memory capacity threshold of the first host;

selecting a target CXL memory logical block from among the one or more unallocated CXL memory logical blocks in the CXL memory resource pool; and allocating a memory resource corresponding to the target CXL memory logical block to the first host via a CXL switch.

In some examples, a plurality of hosts are managed by the CXL FM, and a remaining memory capacity and a remaining memory capacity threshold of each of the plurality of hosts are stored by the CXL FM; where the determining one or more unallocated CXL memory logical blocks in a CXL memory resource pool in response to a determination that a remaining memory capacity of a first host is less than a remaining memory capacity threshold of the first host includes:

for each of the plurality of hosts, determining whether the remaining memory capacity of the host is less than the remaining memory capacity threshold of the host; and determining the one or more unallocated CXL memory logical blocks in the CXL memory resource pool in response to a determination that the remaining memory capacity of the first host is less than the remaining memory capacity threshold of the first host.

In another possible example, the determining one or more unallocated CXL memory logical blocks in a CXL memory resource pool in response to a determination that a remaining memory capacity of a first host is less than a remaining memory capacity threshold of the first host remaining memory capacity threshold includes:

receiving a memory resource request sent from the first host via the CXL switch; where the memory resource request is sent by the first host in response to a determination that a memory management component of the first host determines that the remaining memory capacity is less than the remaining memory capacity threshold of the first host, or the memory resource request is sent by the first host in response to a determination that an operating system of the first host determines that available memory is insufficient; and;

determining the one or more unallocated CXL memory logical blocks in the CXL memory resource pool in response to the memory resource request.

In another possible example, the selecting a target CXL memory logical block from among the one or more unallocated CXL memory logical blocks in the CXL memory resource pool includes:

selecting, based on a single allocation granularity for the first host, a preset number of CXL memory logical blocks from the one or more unallocated CXL memory logical blocks in the CXL memory resource pool as the target CXL memory logical block.

In another possible example, the selecting a target CXL memory logical block from among the one or more unallocated CXL memory logical blocks in the CXL memory resource pool includes:

obtaining an increment of an amount of memory resources occupied by the first host within a preset duration;

in response to the increment being greater than or equal to a preset increment threshold, selecting the target CXL memory logical block from among the one or more unallocated CXL memory logical blocks in the CXL memory resource pool based on the increment; and in response to the increment being less than the preset increment threshold, selecting, based on a single allocation granularity for the first host, a preset number of CXL memory logical blocks from the one or more unallocated CXL memory logical blocks in the CXL memory resource pool as the target CXL memory logical block.

In a possible example, a required resource amount is carried in the memory resource request; and the selecting a target CXL memory logical block from among the one or more unallocated CXL memory logical blocks in the CXL memory resource pool includes:

selecting, from among the one or more unallocated CXL memory logical blocks in the CXL memory resource pool, a CXL memory logical block satisfying the required resource amount as the target CXL memory logical block.

In some examples of the present disclosure, a resource allocation apparatus applied to a CXL FM is provided. The apparatus includes:

a determination module is to determine one or more unallocated CXL memory logical blocks in a CXL memory resource pool in response to a determination that a remaining memory capacity of a first host is less than a remaining memory capacity threshold of the first host;

a selection module is to select a target CXL memory logical block from among the one or more unallocated CXL memory logical blocks in the CXL memory resource pool; and an allocation module is to allocate a memory resource corresponding to the target CXL memory logical block to the first host via a CXL switch.

In a possible example, a plurality of hosts are managed by the CXL FM, and a remaining memory capacity and a remaining memory capacity threshold of each of the plurality of hosts are stored by the CXL FM; the determination module is to:

for each of the plurality of hosts, determine whether the remaining memory capacity is less than the remaining memory capacity threshold; and determine the one or more unallocated CXL memory logical blocks in the CXL memory resource pool in response to a determination that the remaining memory capacity of the first host is less than the remaining memory capacity threshold of the first host.

In a possible example, the determination module is to:

receive a memory resource request sent from the first host via the CXL switch; where the memory resource request is sent by the first host in response to a determination that a memory management component of the first host determines that the remaining memory capacity is less than the remaining memory capacity threshold of the first host, or the memory resource request is sent by the first host in response to a determination that an operating system of the first host determines that available memory is insufficient; and determine the one or more unallocated CXL memory logical blocks in the CXL memory resource pool in response to the memory resource request.

In a possible example, the selection module is to:

select, based on a single allocation granularity for the first host, a preset number of CXL memory logical blocks from the one or more unallocated CXL memory logical blocks in the CXL memory resource pool as the target CXL memory logical block.

In another possible example, the selection module to:

obtain an increment of an amount of memory resources occupied by the first host within a preset duration;

in response to the increment being greater than or equal to a preset increment threshold, select the target CXL memory logical block from among the one or more unallocated CXL memory logical blocks in the CXL memory resource pool based on the increment; and in response to the increment being less than the preset increment threshold, select, based on a single allocation granularity for the first host, a preset number of CXL memory logical blocks from the one or more unallocated CXL memory logical blocks in the CXL memory resource pool as the target CXL memory logical block.

In a possible example, a required resource amount is carried in the memory resource request;

the selection module is to select, from the one or more unallocated CXL memory logical blocks in the CXL memory resource pool, a CXL memory logical block satisfying the required resource amount as the target CXL memory logical block.

In some examples of the present disclosure, a computer-readable storage medium storing a computer program is provided, in response to a determination that the computer program is executed by a processor, the computer program performs the method described above.

In some possible examples of the present disclosure, computer program product containing instructions is provided. In response to a determination that the computer program product runs on a computer, causing the computer to execute the method described above.

Using the above technical solution, in response to a determination that the remaining memory capacity of the first host is less than the corresponding remaining memory capacity threshold, the CXL FM determines the one or more unallocated CXL memory logical blocks in the CXL memory resource pool, selects the target CXL memory logical block from them, and allocates the memory resource corresponding to the target CXL memory logical block to the first host via the CXL switch. The CXL FM may timely and automatically allocate more memory resource to the first host, realizing dynamic on-demand allocation of memory resources. There is no need for manual planning of CXL memory resources for each host separately, solving the problem of complex management of the CXL memory resource pool.

Of course, performing any product or method of the present disclosure does not necessarily require achieving all the advantages mentioned above simultaneously.

BRIEF DESCRIPTION OF THE DRAWINGS

To more clearly illustrate the technical solutions in the examples of the present disclosure or in the prior art, a brief introduction to the accompanying drawings required for describing the examples or related art will be provided below. The accompanying drawings described below are some examples of the present disclosure. For those skilled in the art, other examples may also be obtained based on these accompanying drawings.

DETAILED DESCRIPTION

Illustrative below, the technical solutions in the examples of the present disclosure will be described clearly and completely in conjunction with the accompanying drawings in the examples of the present disclosure. The described examples are merely a part of the examples of the present disclosure, and not all examples. Based on the examples in the present disclosure, all other examples obtained by those skilled in the art based on the present disclosure fall within the protection scope of the present disclosure.

The terminology used in the present disclosure is for the purpose of describing a particular example only, and is not intended to be limiting of the present disclosure. The singular forms such as "a", "said", and "the" used in the present disclosure and the appended claims are further intended to include multiple, unless the context clearly indicates otherwise. It is also to be understood that the term "and/or" as used herein refers to any or all possible combinations that include one or more associated listed items.

The Fabric Manager (FM) may provide a Website User Interface (WEB UI) that enables memory administrators to coordinate and plan CXL memory resource requirements of various hosts. Via the WEB UI, the administrators may allocate memory resources of the CXL memory resource pool to each of the hosts. However, manually planning CXL memory resources for each of the hosts increases the difficulty, making management of the CXL memory resource pool more complex.

Figure 1:
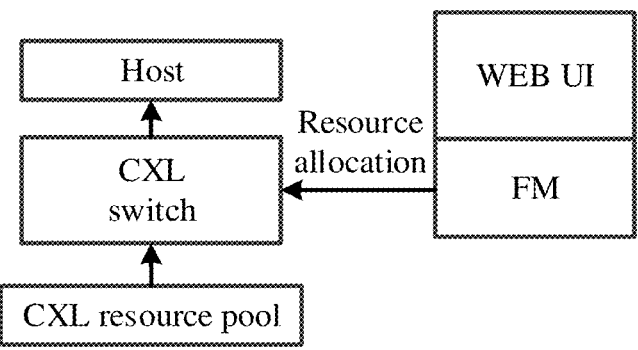
FIG. 1 is a schematic diagram of a CXL memory system in related arts.
Figure 2:
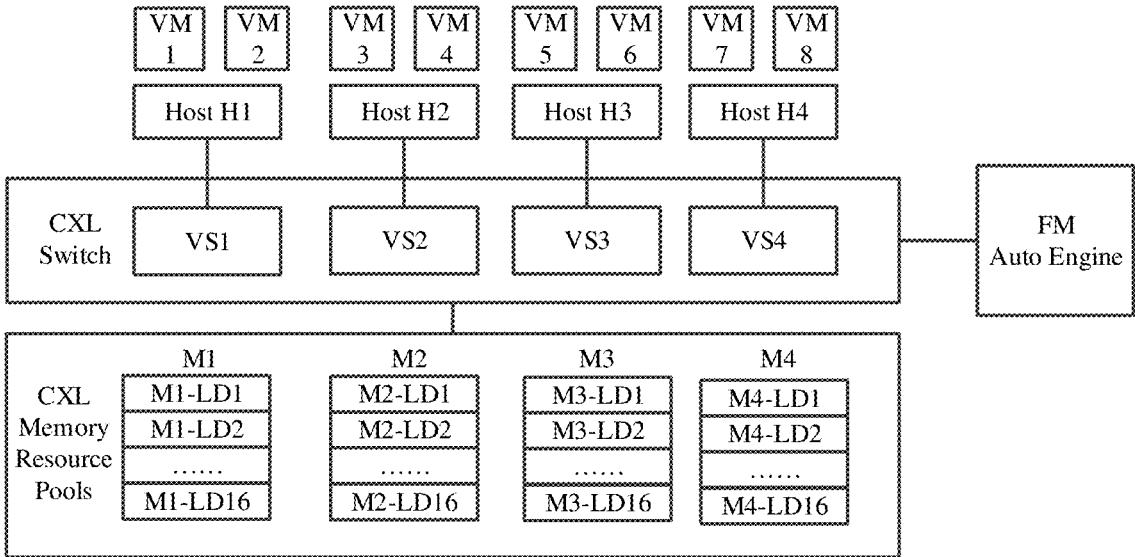
FIG. 2 is a schematic diagram of a CXL memory system according to an example of the present disclosure.

A CXL memory system architecture related to the examples of the present disclosure is to be described below. As shown in FIG. 2, the CXL memory system includes a host, a CXL switch, a CXL memory resource pool, and a CXL fabric manager (FM).

Four hosts illustrated in FIG. 2 are server hosts H1, H2, H3, and H4 respectively. Virtual machine (VM)1 and VM2 run on the server host H1, VM3 and VM4 run on the server host H2, VM5 and VM 6 run on the server host H3, and VM7 and VM8 run on the server host H4. Each of the server hosts H1 to H4 has a memory-management (Mem Mgt) component.

As shown in FIG. 2, four virtual switches created by the CXL switch are virtual switches VS1, VS2, VS3, and VS4. Each virtual switch corresponds to one host connected to the CXL switch via an upstream port. For example, the virtual switch VS1 corresponds to the host H1, the virtual switch VS2 corresponds to the host H2, the virtual switch VS3 corresponds to the host H3, and the virtual switch VS4 corresponds to the H4. The virtual switches are to establish correspondence relationships between the hosts and CXL memory devices.

The CXL memory resource pool includes multiple CXL memory devices, and a controller of each CXL memory device support dividing a CXL memory device into multiple CXL memory logical blocks. In FIG. 2, CXL memory devices M1, M2, M3, and M4 are shown for an example. Each of the CXL memory devices may include multiple CXL memory logical blocks.

For instance, the CXL memory device M1 includes memory logical blocks M1-LD1, M1-LD2, . . . , M1-LD16.

The CXL memory device M2 includes memory logical blocks M2-LD1, M2-LD2, . . . , M2-LD16.

The CXL memory device M3 includes memory logical blocks M3-LD1, M3-LD2, . . . , M3-LD16.

The CXL memory device M4 includes memory logical blocks M4-LD1, M4-LD2, . . . , M4-LD16.

As an example, memory logical block M1-LD1 and memory logical block M1-LD2 are allocated to H1, memory logical block M2-LD1 and memory logical block M2-LD16 are allocated to H2, and the other CXL memory logical blocks are not yet allocated.

In some examples of the present disclosure, an Auto engine is added to the FM. The FM uses the Auto engine to invoke the CXL switch to create virtual switches that correspond to the hosts and are located within the CXL switch, and the FM uses the Auto engine to perform a resource allocation method of the examples of the present disclosure.

The following provides detailed descriptions to the resource allocation method provided by the examples of the present disclosure will be introduced in detail.

Figure 3:
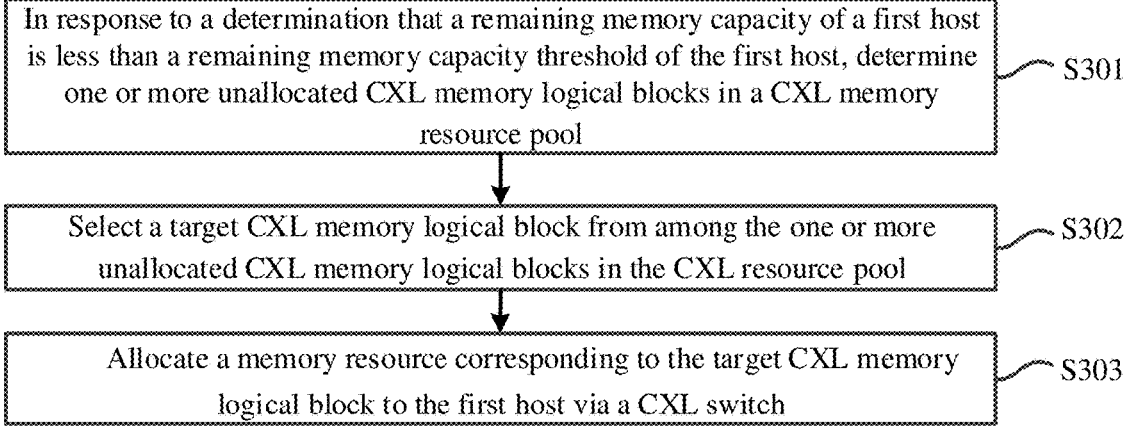
FIG. 3 is a schematic diagram of a resource allocation method according to an example of the present disclosure.

As shown in FIG. 3, the present disclosure provides a resource allocation method, which is performed by a CXL FM (which is also named as a CXL network manager, shown as FM in FIG. 3). The method includes the following processes S301 to S303.

At process S301: in response to determining that a remaining memory capacity of a first host is less than a remaining memory capacity threshold of the first host, determine one or more unallocated CXL memory logical blocks in a CXL memory resource pool.

Each host is preconfigured with a remaining memory capacity threshold, and different hosts may be configured with the same or different remaining memory capacity thresholds.

The first host is any host managed by the FM. That is, in response to a determination that the remaining memory capacity of any host is less than the corresponding remaining memory capacity threshold, processes of allocating CXL memory logical blocks to that host may be triggered.

The unallocated CXL memory logical blocks in the CXL memory pool refer to CXL memory logical blocks that are currently not allocated to any host.

At process S302: select a target CXL memory logical block from among the one or more unallocated CXL memory logical blocks in the CXL memory resource pool.

At process S303: allocate a memory resource corresponding to the target CXL memory logical block to the first host via a CXL switch.

After selecting the target CXL memory logical block, the FM sends identifier information of the target CXL memory logical block to the CXL switch, enabling the CXL switch to establish a binding relationship between the target CXL memory logical block and the first host, so that the first host may use the memory resource corresponding to the target CXL memory logical block.

In some examples, after the first host is allocated the memory resource, the first host may further report its remaining memory resources to the CXL FM via the CXL switch, allowing the CXL FM to confirm a successful allocation of memory resource.

Using this method, in response to a determination that the remaining memory capacity of the first host is less than the corresponding remaining memory capacity threshold, the CXL FM determines the unallocated CXL memory logical blocks in the CXL memory resource pool, selects a target CXL memory logical block from them, and allocates the memory resource corresponding to the target CXL memory logical block to the first host via the CXL switch. In response to a determination that the memory resources of the first host may be insufficient, the CXL FM may automatically allocate memory resource to the first host in time, thereby realizing dynamic on-demand allocation of memory resources. This eliminates the need for manually planning CXL memory resources for each host separately, thereby solving the problem of complex management of the CXL memory resource pool.

In an example of the present disclosure, the allocation of memory resources to the first host may be initiated by the CXL FM. The CXL FM stores a remaining memory capacity and a remaining memory capacity threshold of each host under its management. Each host may periodically report its remaining memory capacity to the CXL FM.

Based on this, the process S301, determining one or more unallocated CXL memory logical blocks in a CXL memory resource pool under the condition that the remaining memory capacity of a first host is less than a corresponding remaining memory capacity of the first host, may be performed as follows:

For each host, determining the condition of the remaining memory capacity of the host is less than the memory capacity threshold of the host. In response to a determination that the memory capacity of the first host is less than its corresponding memory capacity threshold, then determine the unallocated CXL memory logical block(s) in the CXL memory resource pool.

As an example, the CXL FM may maintain a memory usage table for each host, which includes the remaining memory capacity threshold and the remaining memory capacity of each host.

A remaining memory capacity of a host may include a sum of its local remaining memory capacity and CXL remaining memory capacity, and this sum may be included in the memory usage table. In some examples, the memory usage table may separately include the local remaining memory capacity, CXL memory usage capacity, and CXL memory allocated capacity of each host. A difference between the CXL memory allocated capacity and the CXL memory usage capacity represents the CXL remaining memory capacity.

As an example, the memory usage table may be represented as Table 1.

TABLE 1

| Host | Remaining memory capacity threshold | Local remaining memory capacity | CXL memory usage capacity | CXL memory allocated capacity |
|---|---|---|---|---|
| Host 1 | 20G | 512G | 0G | 0.5T |
| Host 2 | 20G | 512G | 0G | 0.5T |
| Host 3 | 20G | 10G | 0G | 0G |

From Table 1, the remaining memory capacity of Host 3, which is 10 G, is less than its remaining memory capacity threshold, which is 20 G. Therefore, the CXL FM may determine the unallocated CXL memory logical blocks in the CXL memory resource pool.

The CXL FM may further maintain a CXL memory idle status table, which includes a usage status of each CXL memory logical block.

As an example, the CXL memory idle status table, in some examples as which shown in FIG. 2 represents the usage of CXL memory logical blocks for CXL memory devices M1 and M2. In actual examples, the CXL memory idle status table includes the usage status of all CXL memory logical blocks in the memory resource pool.

TABLE 2

| CXL memory device | CXL memory logical block | Bound host |
|---|---|---|
| M1 | M1-LD1 | Host 1 |
| M1 | M1-LD2 | Host 1 |
| M1 | M1-LD3 | Unallocated |
| M1 | . . . | Unallocated |
| M1 | M3-LD16 | Unallocated |
| M2 | M2-LD1 | Host 2 |
| M2 | M2-LD2 | Unallocated |
| | . . . | Unallocated |
| M2 | M2-LD16 | Host 2 |

It is understandable that the CXL FM may identify the unallocated CXL memory logical blocks from the CXL memory idle status table.

By adopting this method, the CXL FM may promptly detect hosts with insufficient remaining memory capacity and automatically allocate memory resources to them, thereby achieving elastic allocation. This restores an original demand for hosts to use CXL memory resources, thereby making CXL memory resource management more automated and intelligent. This method may avoid situations where hosts have no available memory.

In another example of the present disclosure, the host may proactively request memory resource allocation from the CXL FM. Based on this, the process S301, determining one or more unallocated CXL memory logical blocks in a CXL memory resource pool under the condition that the remaining memory capacity of a first host is less than a corresponding remaining memory capacity of the first host may be performed as follows:

receiving a memory resource request sent by the first host via the CXL switch, where the memory resource request is sent by the first host in response to a determination that a memory management component of the first host determines that the remaining memory capacity is less than the corresponding remaining memory capacity threshold, or the memory resource request is sent by the first host in response to a determination that an operating system of the first host determines that available memory is insufficient; and in response to the memory resource request, determining the unallocated CXL memory logical block(s) in the CXL memory resource pool.

Each host is pre-configured with its own remaining memory capacity threshold. The first host may monitor its remaining memory capacity in real-time. In response to a determination that the first host's remaining memory capacity is less than the configured remaining memory capacity threshold, the first host may send a memory resource request to the CXL FM. In this way, the host may promptly request a memory resource in response to a determination that its remaining memory capacity is less than the remaining memory capacity threshold, thereby avoiding subsequent situations where there is insufficient memory available, which could affect host performance.

Furthermore, the first host may also send a memory resource request to the CXL FM in response to a determination that its operating system determines that there is insufficient available memory.

Figure 4:
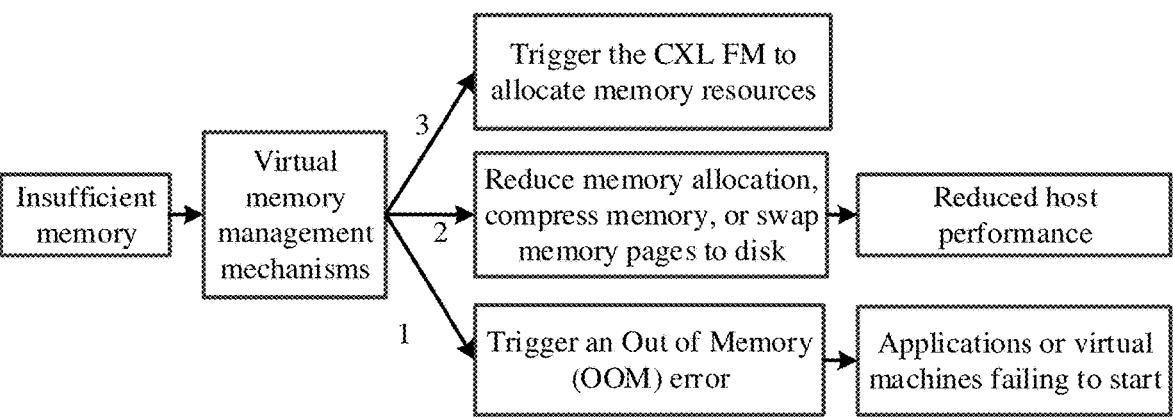
FIG. 4 is a schematic diagram of a handling mechanism under a condition of insufficient memory according to an example of the present disclosure.

The operating system of the host may determine in response to a determination that memory is insufficient via various existing mechanisms. As shown in FIG. 4, in response to a determination that memory is insufficient, i.e., there is not enough physical memory available, the operating system will trigger virtual memory management mechanisms to reduce host performance in order to prevent system crashes or freezes. Typically, mechanisms 1 or 2 in FIG. 4 are adopted.

Mechanism 1 involves triggering an Out of Memory (OOM) error to terminate processes, but adopting mechanism 1 may result in applications or virtual machines failing to start.

Mechanism 2 includes reducing memory allocation, compressing memory, or swapping memory pages to disk, but adopting mechanism 2 may lead to reduced host performance.

An example of the present disclosure may adopt mechanism 3, which triggers the CXL FM to allocate memory resources. In this way, the host may promptly obtain more memory resources, thereby avoiding prolonged performance degradation of the host.

Based on the previous examples, an example of the present disclosure provides two methods for selecting target CXL memory logical block.

Method 1: based on a single allocation granularity of the first host, a preset number of CXL memory logical blocks are selected from the unallocated CXL memory logical blocks in the CXL memory resource pool as the target CXL memory logical block(s).

The single allocation granularity refers to the number of CXL memory logical blocks allocated in a single allocation, which is preset based on experience.

After determining that a memory resource need to be allocated to the first host, the memory resource may be allocated to the first host based on the single allocation granularity. In response to a determination that the remaining memory capacity of the first host is still less than its corresponding remaining memory capacity threshold after the allocation, a memory resource may be allocated again to the first host based on the single allocation granularity until the remaining memory capacity exceeds the remaining memory capacity threshold. This may avoid allocating too much memory resources to a single host, thereby improving the overall utilization of CXL memory resources.

Method 2: an increment of an amount of memory resources occupied by the first host within a preset duration. In response to a determination that the increment is greater than or equal to a preset increment threshold, select the target CXL memory logical block(s) from the unallocated CXL memory logical blocks in the CXL memory resource pool based on the increment.

Both the preset duration and the preset increment threshold are determined in advance based on experience.

The amount of memory resources of each CXL memory logical block is fixed. The CXL FM may determine the number of selected target CXL memory logical blocks based on a quotient of the increment and an amount of memory resources of a single memory logical block.

In response to a determination that the quotient is an integer, the quotient may be designated as the number of the target CXL memory logical blocks. In response to a determination that the quotient is not an integer, the quotient may be rounded up and designated as the number of the target CXL memory logical blocks. In some examples, the rounded-up quotient may be added with a specified value as the number of the target CXL memory logical blocks.

It is understandable that in response to a determination that the increment of amount of memory resources occupied by the first host within the preset duration is greater than or equal to the preset increment threshold, it means that the first host's memory demand has greatly increased in a short period and may continue to increase in the future. In this case, allocating memory resources to the first host based on the increment may satisfy its memory resource demands as much as possible, thereby avoiding memory shortages.

In addition, with the increment being less than the preset increment threshold, the target CXL memory logical block may be selected based on Method 1.

In some examples of the present disclosure, a required resource amount is carried in the memory resource request sent by the first host. Correspondingly, the process S302, selecting a target CXL memory logical block from among the unallocated CXL memory logical blocks in the CXL memory resource pool may be performed as follows:

selecting a CXL memory logical block satisfying the required resource amount from the unallocated CXL memory logical blocks in the CXL memory resource pool as the target CXL memory logical block.

In this case, the CXL FM may be aware of the required resource amount of the first host and allocate resources to the first host according to the requirements of the first host.

The amount of memory resources of each CXL memory logical block is fixed. The CXL network manager may determine the number of selected target CXL memory logical blocks based on a quotient of the required resource amount and an amount of memory resources of a single memory logical block.

In response to a determination that the quotient is an integer, the quotient may be designated as the number of the target CXL memory logical blocks. In response to a determination that the quotient is not an integer, the quotient may be rounded up and designated as the number of the target CXL memory logical blocks.

In some examples, the rounded-up quotient may be added with a specified value as the number of target CXL memory logical blocks. For example, in response to a determination that the quotient is 2, indicating that the first host currently needs 2 CXL memory logical blocks, 3 CXL memory logical blocks may be allocated to the first host, leaving some margin after the allocation, so as to avoid the first host running out of memory resources again in a short period.

Figure 5:
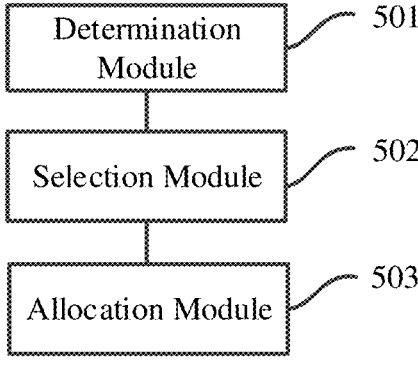
FIG. 5 is a schematic diagram of a resource allocation apparatus according to an example of the present disclosure.

Corresponding to the above method examples, an example of the present disclosure further provides a resource allocation apparatus, which is applied to a CXL FM (also named as a CXL network manager). As shown in FIG. 5, the apparatus includes:

a determination module 501 is to determine one or more unallocated CXL memory logical blocks in a CXL memory resource pool in response to a determination that a remaining memory capacity of a first host is less than a remaining memory capacity threshold of the first host;

a selection module 502 is to select a target CXL memory logical block from among the one or more unallocated CXL memory logical blocks in the CXL memory resource pool; and an allocation module 503 is to allocate a memory resource corresponding to the target CXL memory logical block to the first host via a CXL switch.

In some examples, a plurality of hosts are managed by the CXL FM, and a remaining memory capacity and a remaining memory capacity threshold of each of the plurality of hosts are stored by the CXL FM; the determination module 501 is to:

for each of the plurality of hosts, determine whether the remaining memory capacity of the host is less than the remaining memory capacity threshold of the host; and determine the one or more unallocated CXL memory logical blocks in the CXL memory resource pool in response to a determination that the remaining memory capacity of the first host is less than the remaining memory capacity threshold of the first host.

In some examples, the determination module 501 is to:

receive a memory resource request sent from the first host via the CXL switch; where the memory resource request is sent by the first host in response to a determination that a memory management component of the first host determines that the remaining memory capacity is less than the remaining memory capacity threshold of the first host, or the memory resource request is sent by the first host in response to a determination that an operating system of the first host determines that available memory is insufficient; and determine the one or more unallocated CXL memory logical blocks in the CXL memory resource pool in response to the memory resource request.

In some examples, the selection module 502 is to:

select, based on a single allocation granularity for the first host, a preset number of CXL memory logical blocks from the one or more unallocated CXL memory logical blocks in the CXL memory resource pool as the target CXL memory logical block.

In some examples, the selection module 502 is to:

obtain an increment of an amount of memory resources occupied by the first host within a preset duration;

in response to the increment being greater than or equal to a preset increment threshold, select the target CXL memory logical block from among the one or more unallocated CXL memory logical blocks in the CXL memory resource pool based on the increment; and in response to the increment being less than the preset increment threshold, select, based on a single allocation granularity for the first host, a preset number of CXL memory logical blocks from the one or more unallocated CXL memory logical blocks in the CXL memory resource pool as the target CXL memory logical block.

In some examples, a required resource amount is carried in the memory resource request; and the selection module 502 is to:

select, from the one or more unallocated CXL memory logical blocks in the CXL memory resource pool, a CXL memory logical block satisfying the required resource amount as the target CXL memory logical block.

Figure 6:
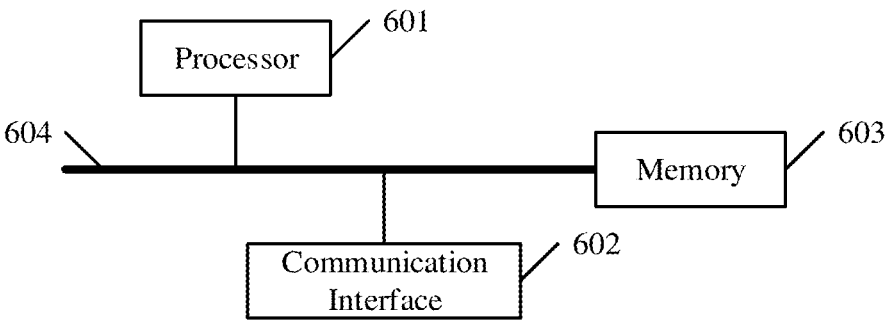
FIG. 6 is a schematic diagram of an electronic device according to an example of the present disclosure.

An example of the present disclosure further provides an electronic device, as shown in FIG. 6, which includes a processor 601, a communication interface 602, a memory 603, and a communication bus 604. The processor 601, the communication interface 602, and the memory 603 communicate with each other via the communication bus 604.

The memory 603 is to store computer programs.

The processor 601, in response to a determination that executing the programs stored on the memory 603, realizes the resource allocation method described in the above method examples.

The communication bus mentioned in the above electronic device may be a Peripheral Component Interconnect (PCI) bus or an Extended Industry Standard Architecture (EISA) bus, etc. The communication bus may be divided into an address bus, a data bus, a control bus, etc. For the convenience of representation, one thick line is used in the figure, but one line does not indicate that there is only one bus or one type of bus.

The communication interface is to communicate between the electronic device and other devices.

The memory may include Random Access Memory (RAM) and may also include Non-Volatile Memory (NVM), such as at least one disk storage device. In some examples, the memory may also be at least one storage apparatus located away from the aforementioned processor.

The processor mentioned above may be a general-purpose processor, including a Central Processing Unit (CPU), a Network Processor (NP), etc.; the professor may also be a Digital Signal Processor (DSP), an Application-Specific Integrated Circuit (ASIC), a Field-Programmable Gate Array (FPGA), or other programmable logic devices, discrete gate or transistor logic devices, discrete hardware components.

In another example provided by the present disclosure, a computer-readable storage medium is further provided, which stores computer programs. in response to a determination that the computer programs are executed by a processor, they perform any one of the resource allocation methods described above.

In another example provided by the present disclosure, a computer program product containing instructions is further provided. In response to a determination that the computer program runs on a computer, the computer program causes the computer to execute any one of the resource allocation methods described in the above examples.

In the above examples, all or part of the examples may be performed via software, hardware, firmware, or any combination thereof. In response to a determination that performed in software, the examples may be performed in the form of one or more computer program products. The computer program products include one or more computer instructions. In response to a determination that the computer instructions are loaded and executed on a computer, all or part of the processes or functions described in the examples of the present disclosure are generated. The computer may be a general-purpose computer, a dedicated computer, a computer network, or other programmable apparatuses. The computer instructions may be stored in a computer-readable storage medium or transmitted from one computer-readable storage medium to another. For example, the computer instructions may be transmitted from one website, computer, server, or data center to another website, computer, server, or data center over a wired (e.g., coaxial cable, optical fiber, Digital Subscriber Line (DSL)) or wireless (e.g., infrared, radio, microwave) manner. The computer-readable storage medium may be any available medium accessible by a computer or an integrated server, data center, or other data storage devices containing one or more available media. The available media may be magnetic media (e.g., floppy disk, hard disk, magnetic tape), optical media (e.g., DVD), or semiconductor media (e.g., Solid State Disk (SSD)), etc.

It should be noted that in the present disclosure, relational terms such as "first" and "second" are used merely to distinguish one entity or operation from another, and do not necessarily require or imply any actual relationship or order between these entities or operations. Moreover, the terms "include," "contain," or any of their other variants are intended to cover a non-exclusive inclusion, such that a process, method, article, or device that includes a list of elements does not exclude the presence of additional identical elements. Without further restrictions, an element defined by the phrase "including a" does not exclude the existence of other identical elements in the process, method, article or device including the element.

The various examples in the present disclosure are described using related approaches, and similar parts among the examples refer to each other for brevity. Each example focuses on describing the differences from other examples. In particular, for apparatus examples, since being substantially similar to method examples, the descriptions are kept brief, and relevant parts refer to the descriptions of the method examples.

The above are only the preferred examples of the present disclosure and are not intended to limit the protection scope of the present disclosure. Any modifications, equivalent substitutions, improvements, etc., made within the spirit and principles of the present disclosure are included within the protection scope of the present disclosure.

What is claimed is:

1. A resource allocation method, performed by a compute express link (CXL) fabric manager (FM) and the method comprising:

determining one or more unallocated CXL memory logical blocks in a CXL memory resource pool in response to a determination that a remaining memory capacity of a first host is less than a remaining memory capacity threshold of the first host;

selecting a target CXL memory logical block from among the one or more unallocated CXL memory logical blocks in the CXL memory resource pool;

allocating a memory resource corresponding to the target CXL memory logical block to the first host via a CXL switch, wherein a plurality of hosts are managed by the CXL FM, and a remaining memory capacity and a remaining memory capacity threshold of each of the plurality of hosts are stored by the CXL FM, wherein the determining one or more unallocated CXL memory logical blocks in a CXL memory resource pool in response to a determination that a remaining memory capacity of a first host is less than a remaining memory capacity threshold of the first host comprises:

for each of the plurality of hosts, determining whether the remaining memory capacity of the host is less than the remaining memory capacity threshold of the host; and determining the one or more unallocated CXL memory logical blocks in the CXL memory resource pool in response to a determination that the remaining memory capacity of the first host is less than the remaining memory capacity threshold of the first host.

2. The method according to claim 1, wherein the determining one or more unallocated CXL memory logical blocks in a CXL memory resource pool in response to a determination that a remaining memory capacity of a first host is less than a remaining memory capacity threshold of the first host remaining memory capacity threshold comprises:

receiving a memory resource request sent from the first host via the CXL switch; wherein the memory resource request is sent by the first host in response to a determination that a memory management component of the first host determines that the remaining memory capacity is less than the remaining memory capacity threshold of the first host, or the memory resource request is sent by the first host in response to a determination that an operating system of the first host determines that available memory is insufficient; and determining the one or more unallocated CXL memory logical blocks in the CXL memory resource pool in response to the memory resource request.

3. The method according to claim 2, wherein the selecting a target CXL memory logical block from among the one or more unallocated CXL memory logical blocks in the CXL memory resource pool comprises:

selecting, based on a single allocation granularity for the first host, a preset number of CXL memory logical blocks from the one or more unallocated CXL memory logical blocks in the CXL memory resource pool as the target CXL memory logical block.

4. The method according to claim 2, wherein the selecting a target CXL memory logical block from among the one or more unallocated CXL memory logical blocks in the CXL memory resource pool comprises:

obtaining an increment of an amount of memory resources occupied by the first host within a preset duration;

in response to the increment being greater than or equal to a preset increment threshold, selecting the target CXL memory logical block from among the one or more unallocated CXL memory logical blocks in the CXL memory resource pool based on the increment; and in response to the increment being less than the preset increment threshold, selecting, based on a single allocation granularity for the first host, a preset number of CXL memory logical blocks from the one or more unallocated CXL memory logical blocks in the CXL memory resource pool as the target CXL memory logical block.

5. The method according to claim 2, wherein a required resource amount is carried in the memory resource request; and the selecting a target CXL memory logical block from among the one or more unallocated CXL memory logical blocks in the CXL memory resource pool comprises:

selecting, from the one or more unallocated CXL memory logical blocks in the CXL memory resource pool, a CXL memory logical block satisfying the required resource amount as the target CXL memory logical block.

6. The method according to claim 1, wherein the selecting a target CXL memory logical block from among the one or more unallocated CXL memory logical blocks in the CXL memory resource pool comprises:

selecting, based on a single allocation granularity for the first host, a preset number of CXL memory logical blocks from the one or more unallocated CXL memory logical blocks in the CXL memory resource pool as the target CXL memory logical block.

7. The method according to claim 1, wherein the selecting a target CXL memory logical block from among the one or more unallocated CXL memory logical blocks in the CXL memory resource pool comprises:

obtaining an increment of an amount of memory resources occupied by the first host within a preset duration;

in response to the increment being greater than or equal to a preset increment threshold, selecting the target CXL memory logical block from among the one or more unallocated CXL memory logical blocks in the CXL memory resource pool based on the increment; or in response to the increment being less than the preset increment threshold, selecting, based on a single allocation granularity for the first host, a preset number of CXL memory logical blocks from the one or more unallocated CXL memory logical blocks in the CXL memory resource pool as the target CXL memory logical block.

8. An electronic device, comprising a processor, a communication interface, a memory, and a communication bus, wherein the processor, the communication interface, and the memory communicate with each other through the communication bus;

the processor is to execute the machine-executable instructions to perform:

determine one or more unallocated compute express link (CXL) memory logical blocks in a CXL memory resource pool in response to a determination that a remaining memory capacity of a first host is less than a remaining memory capacity threshold of the first host;

select a target CXL memory logical block from among the one or more unallocated CXL memory logical blocks in the CXL memory resource pool; and allocate a memory resource corresponding to the target CXL memory logical block to the first host via a CXL switch, wherein a plurality of hosts are managed by the electronic device, and a remaining memory capacity and a remaining memory capacity threshold of each of the plurality of hosts are stored by the electronic device, the processor is to:

for each of the plurality of hosts, determine whether the remaining memory capacity of the host is less than the remaining memory capacity threshold of the host; and determine the one or more unallocated CXL memory logical blocks in the CXL memory resource pool in response to a determination that the remaining memory capacity of the first host is less than the remaining memory capacity threshold of the first host.

9. The electronic device according to claim 8, wherein the processor is to:

receive a memory resource request sent from the first host via the CXL switch; wherein the memory resource request is sent by the first host in response to a determination that a memory management component of the first host determines that the remaining memory capacity is less than the remaining memory capacity threshold of the first host, or the memory resource request is sent by the first host in response to a determination that an operating system of the first host determines that available memory is insufficient; and determine the one or more unallocated CXL memory logical blocks in the CXL memory resource pool in response to the memory resource request.

10. The electronic device according to claim 9, wherein the processor is to:

select, based on a single allocation granularity for the first host, a preset number of CXL memory logical blocks from the one or more unallocated CXL memory logical blocks in the CXL memory resource pool as the target CXL memory logical block.

11. The electronic device according to claim 9, wherein the processor is to:

obtain an increment of an amount of memory resources occupied by the first host within a preset duration;

in response to the increment being greater than or equal to a preset increment threshold, select the target CXL memory logical block from among the one or more unallocated CXL memory logical blocks in the CXL memory resource pool based on the increment; and in response to the increment being less than the preset increment threshold, select, based on a single allocation granularity for the first host, a preset number of CXL memory logical blocks from the one or more unallocated CXL memory logical blocks in the CXL memory resource pool as the target CXL memory logical block.

12. The electronic device according to claim 9, wherein a required resource amount is carried in the memory resource request;

the processor is to select, from the one or more unallocated CXL memory logical blocks in the CXL memory resource pool, a CXL memory logical block satisfying the required resource amount as the target CXL memory logical block.

13. The electronic device according to claim 8, wherein the processor is to:

select, based on a single allocation granularity for the first host, a preset number of CXL memory logical blocks from the one or more unallocated CXL memory logical blocks in the CXL memory resource pool as the target CXL memory logical block.

14. The electronic device according to claim 8, wherein the processor is to:

obtain an increment of an amount of memory resources occupied by the first host within a preset duration;

in response to the increment being greater than or equal to a preset increment threshold, select the target CXL memory logical block from among the one or more unallocated CXL memory logical blocks in the CXL memory resource pool based on the increment; and in response to the increment being less than the preset increment threshold, select, based on a single allocation granularity for the first host, a preset number of CXL memory logical blocks from the one or more unallocated CXL memory logical blocks in the CXL memory resource pool as the target CXL memory logical block.

* * * * *